March 21, 1961 J. E. TABER 2,976,516

RECOGNITION CIRCUIT FOR PULSE CODE COMMUNICATION SYSTEMS

Filed Aug. 6, 1954 4 Sheets-Sheet 1

INVENTOR.
JOHN E. TABER.
BY
Henry Heyman
ATTORNEY

RECOGNITION CIRCUIT FOR PULSE CODE COMMUNICATION SYSTEMS

Filed Aug. 6, 1954 4 Sheets-Sheet 2

INVENTOR.
JOHN E. TABER,
BY
Henry Heyman
ATTORNEY.

INVENTOR.
JOHN E. TABER,
BY
Henry Heyman
ATTORNEY.

INVENTOR.
JOHN E. TABER,
BY
ATTORNEY.

2,976,516

RECOGNITION CIRCUIT FOR PULSE CODE COMMUNICATION SYSTEMS

John Everett Taber, Gardena, Calif., assignor to Hughes Aircraft Company, Culver City, Calif., a corporation of Delaware Filed Aug. 6, 1954, Ser. No. 448,363

6 Claims. (Cl. 340—164)

The present invention relates to recognition circuits for pulse code communication systems and more particularly to a recognition circuit for pulse code communication systems that reliably distinguishes the identifying signals prefixed to pulse coded messages from the interference signals encountered in the field of communications that may cause false recognition.

High speed pulse code communication systems, such as communication systems transmitting intelligence expressed in digital coded form, require the use of high speed message recording equipment. However, messages may be so brief and transmitted so infrequently that continuous recording under such low duty-cycle conditions would be economically unfeasible. Accordingly, the recording equipment is normally maintained inoperative and the communication system is provided with a recognition circuit for starting the recording equipment in the event a desired message is received. The recognition circuit is preferably connected between the communication receiver and the recording equipment and is responsive to an identifying signal prefixed to the transmitted message for putting the recording equipment into operation.

In order that the recognition circuit may best serve its purpose, namely, that of initiating the operation of the recording equipment only when a desired message is received, the recognition circuit must be able to accurately discriminate between true identifying signals and interference signals, such as noise and keyed continuous wave signals, which may frequently cause false recognition. Accordingly, recognition is based on properties of the identifying signal that, to a high degree of probability, are lacking in the noise and other interference signals. One type of identifying signal having a particularly useful property is that in which pulses are repeated at prescribed intervals of time.

In a common type of recognition circuit found in the prior art, the pulses of the identifying signal, hereinafter referred to as sampling pulses, are applied to a threshold circuit comprising an electron discharge device biased negatively beyond its cut-off value to a voltage level slightly greater than the anticipated noise level conditions. The amplitude of each sampling pulse is made to exceed the biasing voltage level, and each sampling pulse applied to the threshold circuit normally produces a corresponding output pulse. The output pulses are counted by a counting circuit connected to the threshold circuit and if the number of output pulses counted is at least a predetermined percentage of the expected number of sampling pulses, the recording equipment controlled by the recognition circuit will be put into operation.

One of the principal disadvantages of this type of recognition circuit is its relatively high degree of susceptibility to false recognition which may be caused by the previously mentioned interference signals. For example, a noise signal applied to the threshold circuit may exceed the voltage level to which the electron discharge device is biased to cause a corresponding output pulse to be applied to the counting circuit. Obviously, if a sufficient number of such noise signals exceed the voltage level in rapid sequence, a bona fide identifying signal may be simulated insofar as the counting circuit is concerned, thereby causing the counting circuit to trip the recording equipment into operation.

The above type of recognition circuit also fails to discriminate against keyed continuous wave or pulsed carrier signals, which are prevalent in the range of frequencies devoted to communications and which frequently cause false recognition. For example, pulsed carrier signals received in rapid succession by the communications receiver and having approximately the frequency at which the communications system is operated will be demodulated by the receiver and applied as pulses to the threshold circuit. As previously explained, a corresponding number of output pulses will be applied to the counting circuit and if at least the required number of such pulses is counted by the counting circuit, the recording equipment will be put into operation. Furthermore, false recognition may occur even though only one pulsed carrier signal of relatively extended duration is received by the communications receiver. In this case, a voltage pulse of corresponding duration would be applied to the counting circuit that would have an effect equivalent to the application of several pulses to be counted, thereby falsely initiating the operation of the recording equipment.

The present invention overcomes the above and other disadvantages of the recognition circuits found in the prior art by providing a recognition circuit that reliably discriminates against interference signals that may cause false recognition. According to the basic concept of this invention, a received identifying signal is represented by first and second groups of pulses which are combined to produce a composite signal having a positive portion and a negative portion lagging the positive portion by an interval of time equal to a pulse duration. The amplitudes of the positive and negative portions correspond to the sums of the amplitudes of the first and second groups of pulses, respectively, multiplied by a first proportionality factor. The composite signal is then applied to a threshold device biased to a voltage level equal to the product of a second proportionality factor, smaller than the first proportionality factor, and the product of the amplitude and a predetermined minimum number of pulses of the first group of pulses.

More particularly, according to an embodiment of the present invention, a group of $n$ time spaced pulses of equal amplitude and duration and representing an identifying signal is serially applied to a delay line network which delays each of the $n$ applied pulses to simultaneously produce a group of $n$ pulses at first and second instants of time, the second instant lagging the first instant by an interval of time equal to a pulse duration. Each group of $n$ pulses is linearly added to produce first and second output signals, the amplitude of each output signal being equal to the instantaneous sum of the amplitudes of the $n$ pulses multiplied by a reduction factor. The first and second output signals are then applied to the first and second input terminals, respectively, of a difference network which, in response thereto, produces a composite signal equal in amplitude to the instantaneous difference between the amplitudes of the first and second output signals multiplied by an amplification factor. Recognition is indicated by applying the composite signal to a threshold device which is biased to a voltage level less than the product of the reduction factor, the amplification factor, and the amplitude and a predetermined minimum number of pulses of the $n$ applied pulses.

According to another embodiment of the present invention, a group of $n$ time spaced pulses of equal amplitude and duration and representing an identifying signal is serially applied to a delay line which delays each pulse by an interval of time equal to a pulse duration to produce a group of $n$ image pulses. Each pair of applied and corresponding image pulses are applied to the first and second input terminals, respectively, of a difference network which, in response thereto, produces a composite signal equal in amplitude to the instantaneous difference between the amplitudes of the associated applied and image pulses multiplied by an amplification factor. The resulting $n$ composite signals are applied serially to a delay line network which simultaneously produces $n$ composite signals which, in turn, are linearly added to produce a single composite signal equal in amplitude to the instantaneous sum of the amplitudes of the $n$ composite signals multiplied by a reduction factor. As in the previously discussed embodiment, recognition is indicated by applying the single composite signal to a threshold device biased to a voltage level less than the product of the reduction factor, the amplification factor, and the amplitude and a predetermined minimum number of pulses of the $n$ applied pulses.

A particularly desirable feature of the recognition circuit of the present invention is that it provides a satisfactory method for rejecting pulsed carrier signals of relatively extended duration that may cause false recognition, as previously explained. Any pulsed carrier signals applied to the circuit will be simultaneously applied to the first and second input terminals of the difference network and, since the difference network produces an output signal corresponding in amplitude to the instantaneous difference between the amplitudes of the signals applied to the first and second input terminals, the pulsed carrier signal will nullify itself.

Another desirable feature of the recognition circuit of the present invention is that it provides optimum discrimination against impulse and random noise signals that may be interpreted as an identifying signal. The problem of impulse noise is eliminated by requiring all signals applied to the recognition circuit to pass through a limiter network which limits the amplitude of these signals to a safe voltage level. Furthermore, by linearly adding the $n$ simultaneously produced pulses or composite signals, the corresponding noise signals of random amplitudes and phases will be combined on a R.M.S. basis and the signal-to-noise ratio will be improved by a factor $\sqrt{n}$. Accordingly for a fixed average noise level and an adequate number of applied pulses, a threshold voltage level can be set which will almost never be reached by action of the random noise alone, even though, at any one instant, an applied pulse may be exceeded by the noise.

It is, therefore, an object of the present invention to provide a recognition circuit for pulse code communication systems that produces an output pulse in response to at least a predetermined minimum number of pulses of $n$ applied pulses.

Another object of the present invention is to provide a recognition circuit for pulse code communication systems that improves the signal-to-noise ratio of the $n$ applied pulses by linearly adding the pulses or combinations thereof.

A further object of the present invention is to provide a recognition circuit for pulse code communication systems that discriminates against interference signals having other than the predetermined time spacing of the $n$ applied pulses.

A still further object of the present invention is to provide a recognition circuit for pulse code communication systems that discriminates against keyed continuous wave signals of relatively extended duration by producing a composite signal whose amplitude corresponds to the instantaneous difference between the sum of the amplitudes of first and second groups of pulses representing the identifying signal, the second group lagging the first group by an interval of time equal to a pulse duration.

An additional object of the present invention is to provide a recognition circuit for multichannel pulse code communication systems by superimposing corresponding pulses applied in each channel to produce a single group of time spaced pulses.

The novel features which are believed to be characteristic of the invention, both as to its organization and method of operation, together with further objects and advantages thereof, will be better understood from the following description considered in connection with the accompanying drawings in which two embodiments of the invention are illustrated by way of examples. It is to be expressly understood, however, that the drawings are for the purpose of illustration and description only, and are not intended as a definition of the limits of the invention.

Figures 1, 2:
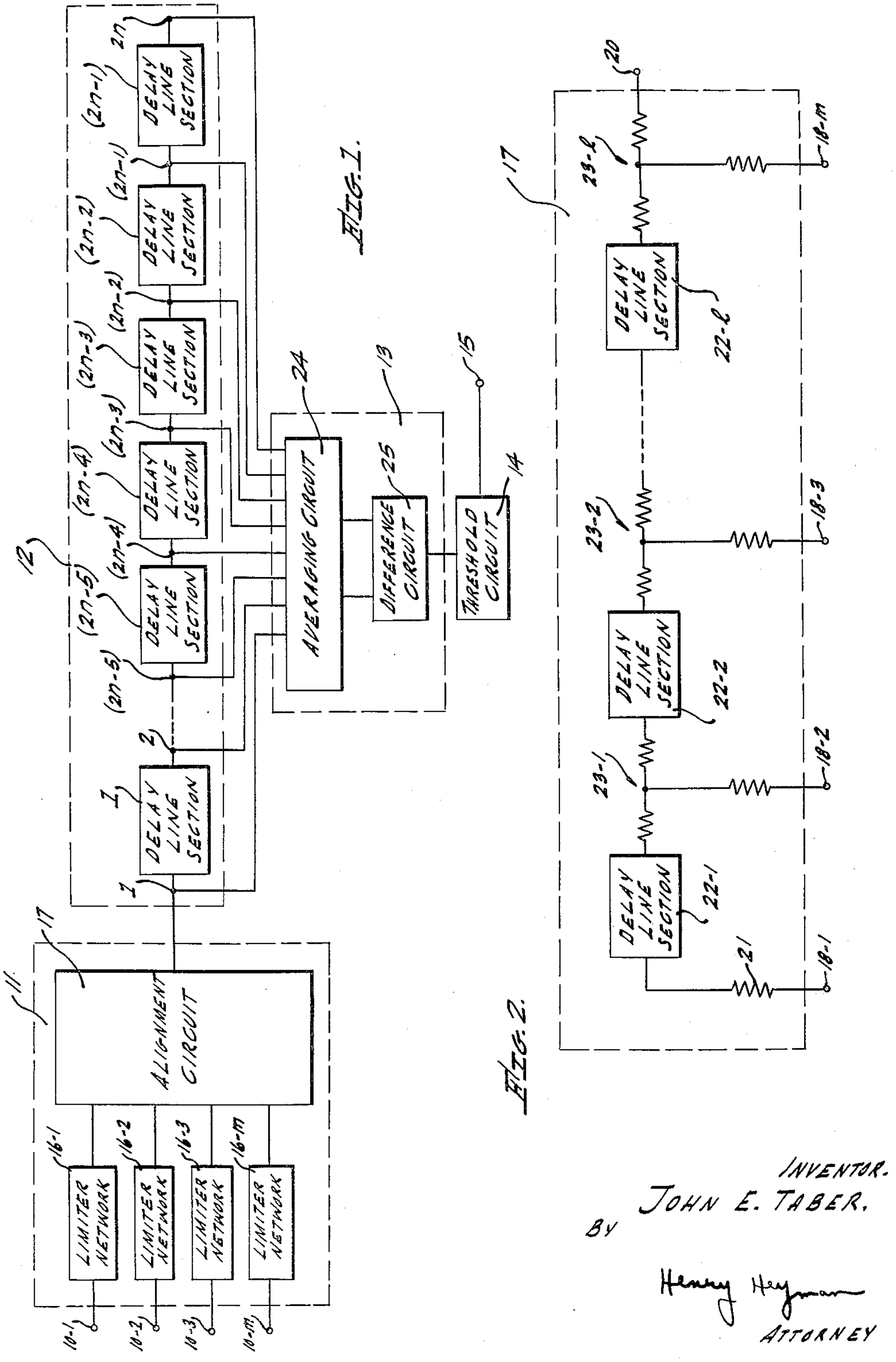
Figure 1 is a block diagram of one embodiment of a recognition circuit for pulse code communication systems according to the present invention.
Figure 2 is a circuit diagram, partly in block form, of one type of alignment circuit shown in Fig. 1.

Referring now to the drawings, there is shown in Fig. 1 a recognition circuit, according to the present invention, for producing an output pulse in response to the application of an identifying signal comprising $m$ time spaced groups of $n$ time spaced pulses of substantially equal amplitude and duration. The recognition circuit comprises an input network 11 for superimposing corresponding pulses of the $m$ groups of applied pulses to produce a single group of $n$ time spaced pulses of substantially equal amplitude and duration; a delay line network 12 for delaying the group of $n$ time spaced pulses to simultaneously produce first and second groups of $n$ pulses at first and second instants of time, respectively, the second instant lagging the first instant by an interval of time equal to a pulse duration; a combining network 13 which combines the simultaneously produced first and second groups of pulses to produce a composite signal having a positive portion and a negative portion, the amplitude of the positive and negative portions being equal to the sum of the amplitudes of the $n$ pulses multiplied by a first proportionality factor; and a threshold circuit 14 which, in response to a predetermined amplitude of the composite signal, produces the output pulse at an output terminal 15.

Input circuit 11 includes $m$ input terminals 10–1 to 10–$m$ for receiving the $m$ applied groups of pulses, respectively, a plurality of limiter networks 16–1 to 16–$m$, one connected to each input terminal, for limiting the amplitude of the applied pulses to a fixed voltage level, and an alignment circuit 17 connected to the output terminals of limiters 16–1 to 16–$m$ for superimposing the corresponding pulses of the $m$ applied groups of pulses, to produce the single group of $n$ time spaced pulses previously mentioned. Examples of limiters that may be used are found on pages 158 through 169 of Radar Electronic Fundamentals, Technical Manual 11–466, published by the War Department in June 1944.

One type of alignment circuit 17 is shown in Fig. 2 and includes a plurality of input terminals 18–1 to 18–$m$ coupled to the output ends of limiters 16–1 to 16–$m$, respectively, an output terminal 20, a matching resistor 21 connected at one end to input terminal 18–1, and ($m$–1) delay line sections 22–1 to 22–$l$ connected in tandem between the other end of resistor 21 and output terminal 20. The (X)th delay line section, where X is an integer from one through ($m$–1), has a time delay equal to the time interval between the leading edge of a pulse in the (X)th group of pulses and the leading edge of a corresponding pulse in the $(X+1)$th group of pulses. An example of a delay line section that may be used is shown in Fig. 22.16 on page 746 of vol. 19 of the M.I.T. Radiation Laboratory Series, published in 1949 by the McGraw-Hill Book Company, Inc. Delay line sections 22–1 to 22–$l$ are coupled to input terminals 18–2 to 18–$m$ through a plurality of T-pad attenuators 23–1 to 23–$l$, each T-pad attenuator except the last, namely, T-pad attenuator 23–$l$, being connected between an associated input terminal and the output and input ends connecting an associated pair of adjacent delay line sections. T-pad attenuator 23–$l$ is connected between input terminal 18–$m$ and the output end of delay line section 22–$l$ output terminal 20. The resistor and T-pad attenuators match the various delay line sections to prevent reflections and have attenuation characteristics such that the group of $n$ time spaced pulses produced by alignment circuit 17 at output terminal 20 are of substantially equal amplitude.

Delay line network 12 is connected to the output end of input circuit 11, or, in other words output terminal 20 of alignment circuit 17, and is provided with ($2n$–1) delay line sections of the type indicated for alignment circuit 17. The delay line sections are connected in tandem, the $(2X-1)$th section, where X is an integer from 1 through $n$, having a time delay equal to a pulse duration and the $(2Y)$th section, where Y varies integrally from 1 through $(n-1)$, having a time delay equal to the time interval between the lagging edge of the $(n-Y)$th pulse and the leading edge of the $(n-Y+1)$th pulse. In order to simultaneously produce the $n$ pulses at first and second instants of time, each of the ($2n$–1) delay line sections is tapped at its input and output ends, the tap at the output end of each section but the last being connected directly to the tap at the input end of the immediately succeeding section. In other words, delay line network 12 is tapped at ($2n$) points along the line, designated as taps 1 through $2n$ in Fig. 1, the $n$ time spaced pulses being simultaneously produced at the odd numbered taps at the first instant of time and at the even numbered taps at the second instant of time.

Combining network 13 comprises an averaging circuit 24 having first and second output terminals and $2n$ input terminals connected to the $2n$ taps, respectively, of delay line network 12, and a difference circuit 25 having first and second input terminals, connected to the first and second output terminals, respectively, of averaging circuit 24. Averaging circuit 24 may be any conventional circuit for producing at its first and second output terminals signals representing the sums of the signals applied to its odd- and even-numbered input terminals, respectively. In its simplest form, averaging circuit 24 comprises two sets of $n$ resistors connected between its odd-numbered input terminals and its first output terminal, and between its even-numbered input terminals and its second output terminal, respectively.

The difference circuit may be any type of circuit that produces an output signal proportional in amplitude to the instantaneous difference of the amplitudes of the signals applied to the first and second input terminals. Suitable types of difference circuits are illustrated and discussed on pages 113 through 117 of "Electron Tube Circuits" by Samuel Seely, published in 1950 by the McGraw-Hill Book Company, Inc.

The output signal produced by difference circuit 25 constitutes the composite signal produced by combining network 13 and is equal in amplitude to the instantaneous difference between the sums of the amplitudes of the simultaneously produced first and second groups of pulses multiplied by a first proportionality factor. This signal is applied to threshold circuit 14 which is biased to a voltage level equal to the product of a second proportionality factor smaller than the first proportionality factor and the product of the amplitude and a predetermined minimum number of pulses of the group of $n$ time spaced pulses applied to delay line network 12. Threshold circuit 14 produces an output pulse at output terminal 15 in response to the composite signal whenever at least the predetermined minimum number of pulses are applied to the delay line network. A threshold circuit that may be used is illustrated in Fig. 9.3($c$) on page 329 of volume 19 of the M.I.T. Radiation Laboratory Series, published in 1949 by the McGraw-Hill Book Co., Inc.

Figure 3:
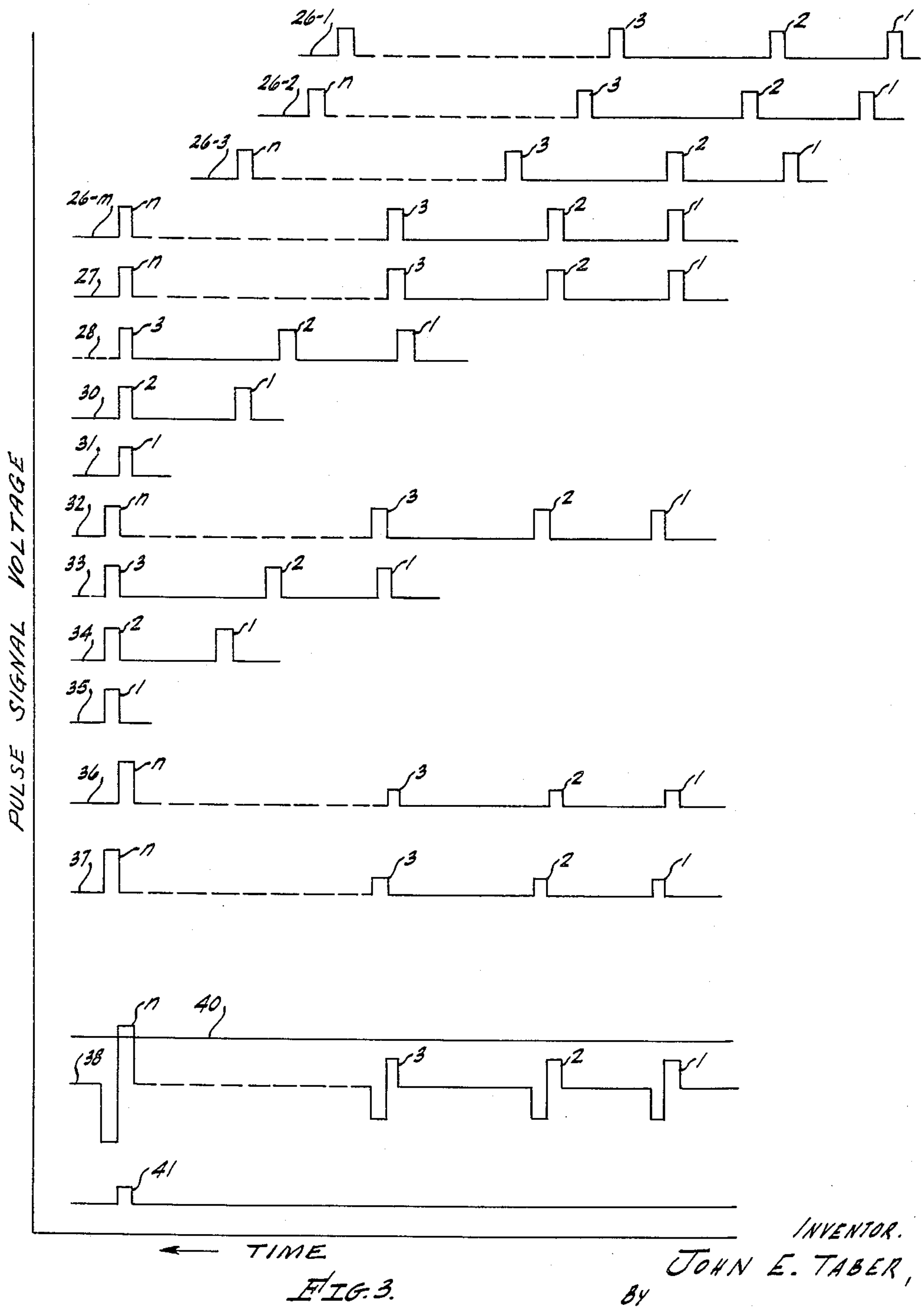
Figure 3 is a composite diagram of waveforms representative of the signals produced at various points in the circuit of Fig. 1.

In operation, $m$ time spaced groups of $n$ time spaced pulses of equal amplitude and duration, shown as waveforms 26–1 to 26–$m$ in Fig. 3, are applied to input terminals 10–1 to 10–$m$, one group to each terminal, the time interval between pulses of any one group being equal to the time interval between corresponding pulses in any other group and the time interval between corresponding pulses of any two groups being equal to the time interval between any other corresponding pulses of the two groups. The $m$ groups of $n$ pulses are applied through limiter networks 16–1 to 16–$m$ to alignment circuit 17 which superimposes corresponding pulses of the $m$ applied groups of pulses to produce a single group of $n$ time spaced pulses of substantially equal amplitude and duration, as illustrated by waveform 27 in Fig. 3.

More specifically, pulse 1 of pulse group 26–1 applied to input terminal 10–1 is delayed by delay line section 22–1 for an interval of time equal to the time spacing between the leading edge of pulse 1 of group 26–1 and the leading edge of corresponding pulse 1 of group 26–2 subsequently applied to input terminal 10–2. Thus, corresponding pulses 1 of pulse groups 26–1 and 26–2 applied to terminals 10–1 and 10–2, respectively, are superimposed, the superimposed pulses being further delayed by delay line sections 22–2 to 22–$l$ to be superimposed upon corresponding pulses 1 of groups 26–3 to 26–$m$ subsequently applied to input terminals 10–3 to 10–$m$, thereby to produce pulse 1 of the $n$ time spaced pulses of output pulse group 27 of alignment circuit 17. Corresponding pulses 2, 3 . . . $n$ of the $m$ applied groups of pulses are also superimposed in the manner just described to produce pulses 2, 3 . . . $n$ of the $n$ time spaced pulses of pulse group 27, the amplitudes of the corresponding pulses in their successive stages of superposition being adjusted by the T-pad attenuators so that the $n$ pulses of pulse group 27 are substantially equal in amplitude.

The $n$ time spaced pulses of pulse group 27 are serially applied to delay line network 12 which simultaneously produces first and second groups of $n$ pulses at first and second instants of time, respectively, as partly shown by pulses $n$, 3, 2, 1 of waveforms 27, 28, 30, 31, respectively, and pulses $n$, 3, 2, 1 of waveforms 32, 33, 34, 35, respectively in Fig. 3. As shown in Fig. 3 the second instant lags the first instant by an interval of time equal to a pulse duration. In other words, the ($2n$–1) delay line sections of delay network 12 delay the $n$ time spaced pulses of pulse group 27 in accordance with the time intervals between the pulses to simultaneously produce pulses $n$, 3, 2, 1 pulses of waveforms 27, 28, 30, 31, respectively, at the odd numbered delay line taps at the first instant of time and delay simultaneously produced pulses $n$, 3, 2, 1 of waveforms 27, 28, 30, 31, respectively, for an interval of time equal to a pulse duration to simultaneously produce pulses $n$, 3, 2, 1 of waveforms 32, 33, 34, 35, respectively, at the even numbered delay line taps at the second instant of time.

Stated differently for clarity, pulses 1, 2, 3 . . . $n$ of pulse group 27, as shown in Fig. 3, are produced at delay line tap 1 of delay line network 12, shown in Fig. 1, up to and including the first instant of time and pulses 1, 2, 3 . . . *n* of pulse group 32 are produced at delay line tap 2 up to and including the second instant of time. Similarly, pulses 1, 2, 3 of pulse group 28, pulses 1, 2 of pulse group 30, and pulse 1 of pulse group 31 are produced at taps (2*n*–5), (2*n*–3), and (2*n*–1), respectively, up to and including the first instant of time and pulses 1, 2, 3 of pulse group 33, pulses 1, 2 of pulse group 34, and pulse 1 of pulse group 35 are produced at taps (2*n*–4), (2*n*–2), and (2*n*), respectively, up to and including the second instant of time. It can be seen, therefore, from waveforms 27, 28, 30, 31 and waveforms 32, 33, 34, 35, in Fig. 3, that pulses *n*, 3, 2, 1 of pulse groups 27, 28, 30, 31, respectively, are simultaneously produced at the odd numbered delay line taps at the first instant of time and that pulses *n*, 3, 2, 1 of pulse groups 32, 33, 34, 35, respectively, are simultaneously produced at the even-numbered taps at the second instant of time.

It should be noted that, for purposes of illustration, only a few of the 2*n* delay line taps of delay line network 12 are shown in Fig. 1 and that only pertinent portions of the associated illustrative pulse groups are shown in Fig. 3. It will be recognized, therefore, that pulses *n*, 3, 2, 1 of pulse groups 27, 28, 30, 31 and 32, 33, 34, 35, respectively, represent only a portion of the first and second groups of *n* pulses simultaneously produced at the first and second instants of time, respectively.

Pulse groups 27, 28, 30, 31 and pulse groups 32, 33, 34, 35 are applied to combining network 13 which, in response thereto, produces a group of composite signals, indicated by waveform 38 in Fig. 3. Each composite signal is equal in amplitude to the instantaneous difference between the sums of the amplitudes of the corresponding pulses of pulse groups 27, 28, 30, 31 and 32, 33, 34, 35 multiplied by the first proportionality factor. More particularly, pulse groups 27, 28, 30, and 31 are linearly added by averaging circuit 24 which, in response thereto, applies a first pulse group, waveform 36 in Fig. 3, to the first input terminal of difference circuit 25. Similarly, in response to pulse groups 32, 33, 34, and 35, averaging circuit 24 applies a second pulse group, waveform 37 in Fig. 3, to the second input terminal of difference circuit 25, the amplitude of each pulse in pulse groups 36 and 37 being equal to the sums of the amplitudes of the corresponding pulses in pulse groups 27, 28, 30, 31 and 32, 33, 34, 35, respectively, multiplied by a reduction factor whose value is determined by the value of the resistors of the averaging circuit. Thus, pulse groups 36 and 37 applied to the first and second input terminals of difference circuit 25, respectively, comprise a plurality of time spaced pulses of varying amplitude, the amplitude of the *n*th pulse in each pulse group having the greatest value and being equal to the sum of the amplitudes of the simultaneously produced first and second groups of pulses, respectively, as represented by pulses *n*, 3, 2, 1 of pulse groups 27, 28, 30, 31 and 32, 33, 34, 35, respectively.

Difference circuit 25 is responsive to pulse groups 36 and 37 for producing a group of composite signals, waveform 38 in Fig. 3; each composite signal having a positive portion and a negative portion lagging the positive portion by an interval of time equal to a pulse duration. The amplitude of each composite signal is equal to the instantaneous difference between the amplitudes of the corresponding pulses of pulse groups 36 and 37 multiplied by an amplification factor equal to the gain of the difference circuit. Accordingly, since the *n*th pulses of pulse groups 36 and 37 have the greatest amplitude, corresponding composite signal *n* of composite signal group 38 also has the greatest amplitude, as shown in Fig. 3.

Composite signal group 38 is applied to threshold circuit 14 which, it will be remembered, is based to a voltage level equal to the product of a second proportionality factor smaller than the first proportionality factor and the product of the amplitude and a predetermined minimum number of pulses of the group of *n* time spaced pulses applied to delay line network 12. Thus, by selecting a suitable second proportionality factor, threshold circuit 14 may be biased to a voltage level such that an output pulse is poduced at output terminal 15 only in response to a composite signal whose amplitude exceeds the biasing voltage and is representative of at least a predetermined minimum number of pulses of the group of *n* pulses applied to delay line network 12, as shown in Fig. 3 by the relationship between composite signal *n* of composite signal group 38, biasing voltage level 40, and resultant output pulse 41.

Figure 4:
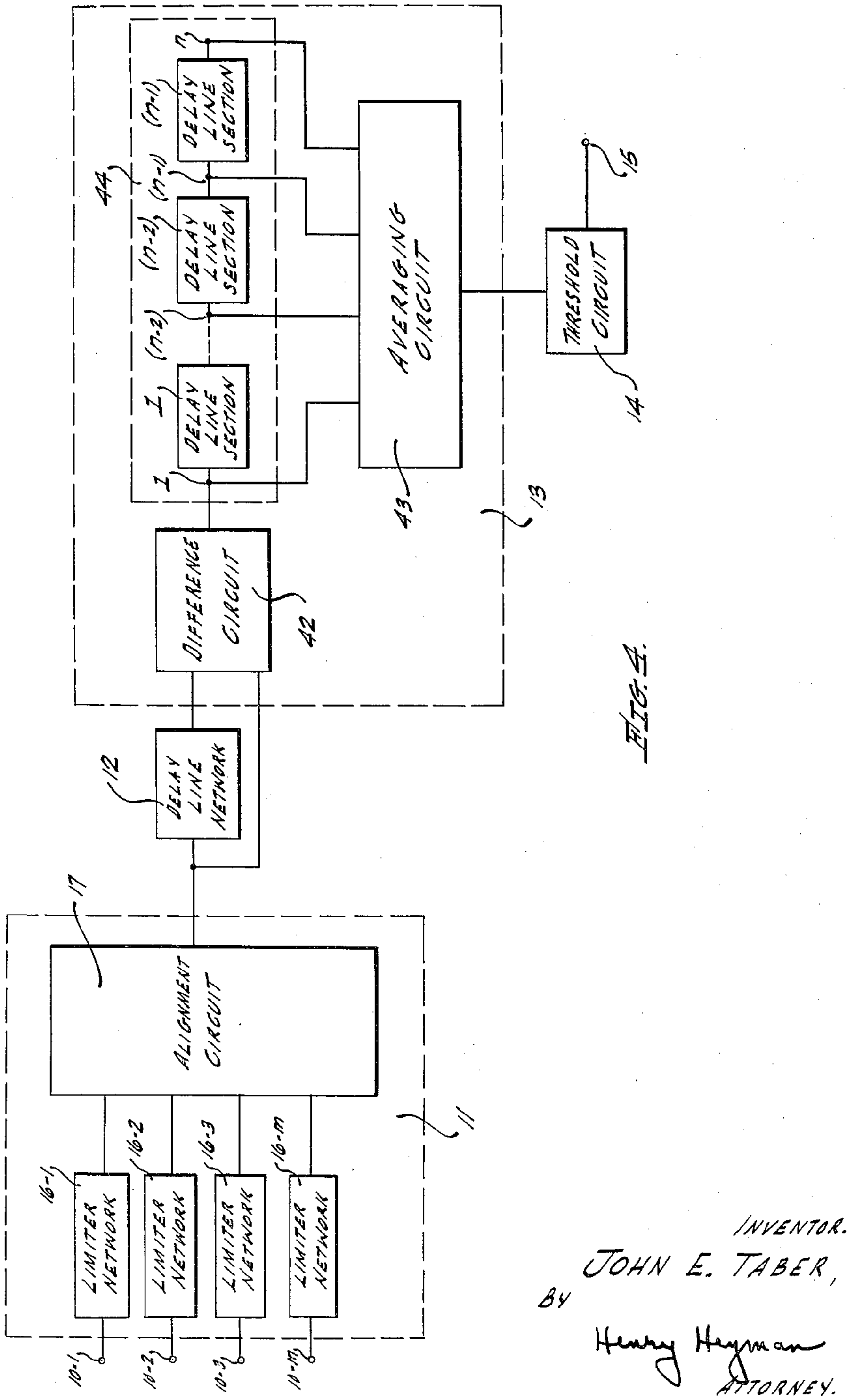
Figure 4 is a block diagram of another embodiment of a recognition circuit for pulse code communication systems according to the present invention.

It will be recalled that delay line network 12 requires 2*n*–1 delay line sections connected in tandem for ultimately producing composite signal group 38. It is possible, however, to produce composite signal group 38 with the use of only *n* delay line sections. Accordingly, another embodiment of a recognition circuit is provided, according to the present invention, as shown in Fig. 4, for producing an output pulse in response to the application of *m* time spaced groups of *n* time spaced pulses of equal amplitude and duration, the recognition circuit comprising, as before, an input network 11, a delay line network 12, a combining network 13, and a threshold circuit 14 having an output terminal 15.

Input network 11 of this embodiment is identical to the input network shown in Fig. 1 and comprises *m* input terminals, *m* limiter networks 16–1 to **16–*m* of the type indicated for Fig. 1 and an alignment circuit 17 of the type shown in Fig. 2. The output terminal of alignment circuit 17, which constitutes the output terminal of input network 11, is connected to the input terminal of delay line network 12, which has a time delay equal to a pulse duration and comprises at least one delay line section of the type used for alignment circuit 17**.

Combining network 13 combines the output pulses of input network 11 and delay line network 12 to produce a composite signal having positive and negative portions, respectively, the amplitude of the positive and negative portions being equal to the sums of the amplitudes of the *n* pulses multiplied by a first proportionality factor. For this purpose, combining network 13 comprises a difference circuit 42, an averaging circuit 43 and a delay line network 44 connected between difference circuit 42 and averaging circuit 43.

Difference circuit 42 is the same as difference circuit 25 shown in Fig. 1 and has first and second input terminals connected to the output terminals, respectively, of input network 11 and delay line network 12. Delay line network 44 includes ($n$–1) delay line sections connected in tandem with the input end of the first section connected to the output terminal of difference circuit 42, the total delay time of the network being equal to the time interval between the leading edges of the first and ($n$)th pulses of the group of *n* pulses produced by input network 11. The (X)th delay line section of delay line network 44, where X varies integrally from 1 through ($n-1$), has a time delay equal to the time interval between the leading edge of the ($n-X$)th pulse and the leading edge of the ($n-X+1$)th pulse. Delay line network 44 further includes *n* output terminals connected to the input ends of the ($n-1$) delay line sections and to the output end of the ($n-1$)th section, respectively. Averaging circuit 43 is similar to one half of averaging circuit 24 of Fig. 1, that, is averaging circuit 43 includes *n* input terminals connected to the *n* output terminals, respectively, of delay line network 44, and a single output terminal for presenting an output signal representing the sum of the signals applied to the *n* input terminals multiplied by a first proportionality factor.

Threshold circuit 14 is connected to the output terminal of averaging circuit 43 and is biased to a voltage level equal to the product of a second proportionality factor, smaller than the first proportionality factor, and the product of the amplitude and a predetermined minimum number of pulses of the group of $n$ time spaced pulses applied to delay line network 12. Threshold circuit 14 may be of the type indicated for Fig. 1 and produces an output pulse at output terminal 15 whenever at least the predetermined minimum number of pulses are applied to the delay line network.

Figure 5:
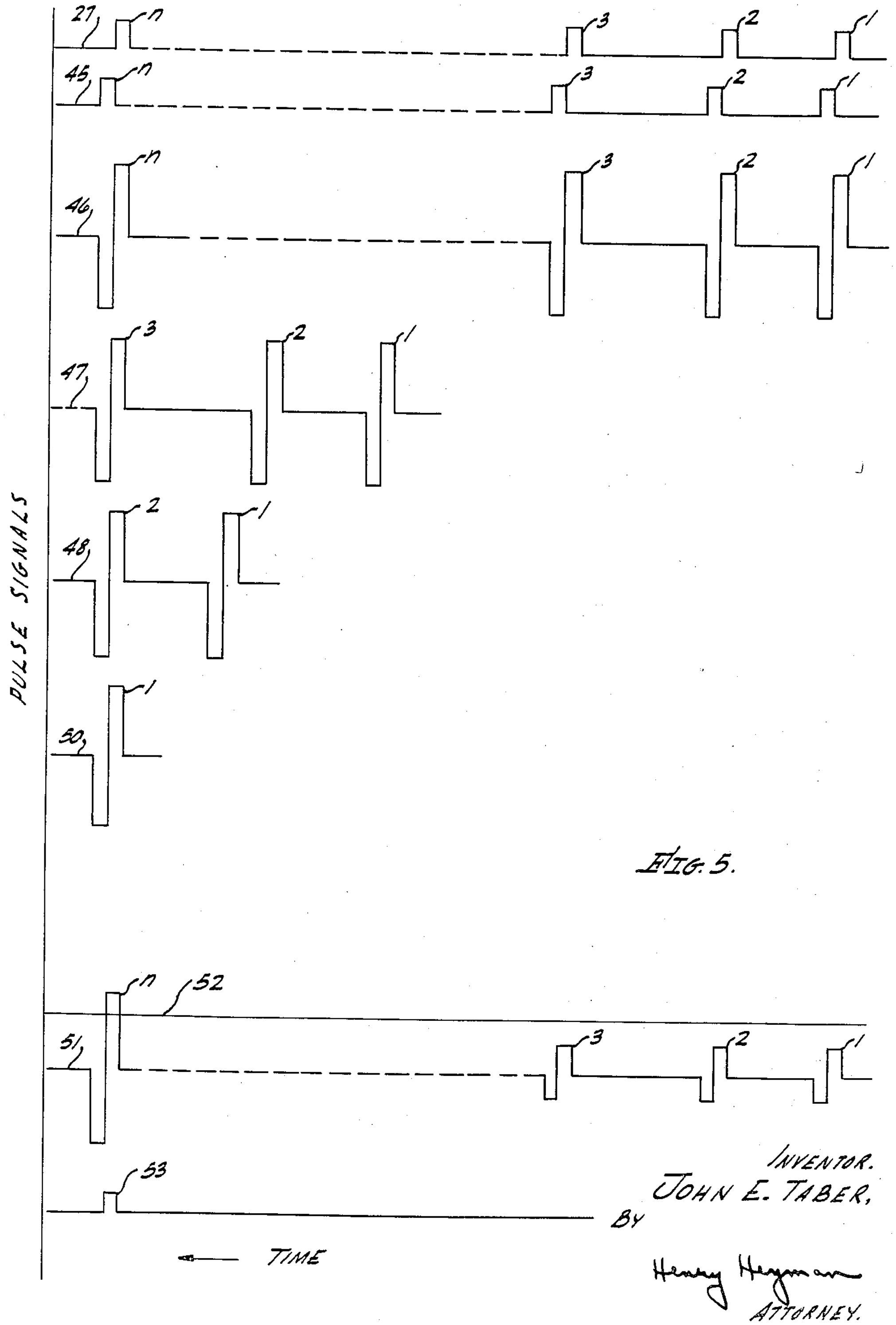
Figure 5 is a composite diagram of waveforms representative of the signals produced at various points in the circuit of Fig. 4.

In operation, pulse groups 26–1 to 26–$m$, as shown in Fig. 3, are received by the recognition circuit at input terminals 10–1 to 10–$m$, respectively, and applied through limiter networks 16–1 to 16–$m$ to alignment circuit 17 which superimposes corresponding pulses of pulse groups 26–1 to 26–$m$ to produce pulse group 27, shown in Fig. 3, and, for clarity, shown again in Fig. 5. Thus, as previously described, pulses 1,2,3 . . . $n$ of pulse group 26–1 applied to input terminal 10–1 are delayed by delay line section 22–1, shown in Fig. 2, for an interval of time equal to the time spacing between the leading edge of pulses 1, 2, 3 . . . $n$ of group 26–1 and the leading edge of corresponding pulses 1, 2, 3 . . . $n$ of group 26–2 subsequently applied to input terminal 10–2 to be superimposed upon corresponding pulses 1, 2, 3 . . . $n$ of group 26–2. The superimposed pulses are further delayed by delay line sections 22–2 to 22–$l$ to be superimposed upon corresponding pulses 1,2,3 . . . $n$ of pulse groups 26–3 to 26–$m$ subsequently applied to input terminals 10–3 to 10–$m$, respectively, thereby to produce pulses 1, 2, 3 . . . $n$ of pulse group 27.

The $n$ time spaced pulses of pulse group 27 are serially applied to delay line network 12 and to the first input terminal of difference circuit 42, the delay line network delaying each of the $n$ pulses for an interval of time equal to a pulse duration to apply an image group of pulses, shown as waveform 45 in Fig. 5, to the second input terminal of difference circuit 42. In other words, pulse group 45 applied to the second input terminal of difference circuit 42 is substantially a reproduction of pulse group 27 applied to the first input terminal with the exception that pulse group 45 is delayed with respect to pulse group 27 by an interval of time equal to a pulse duration.

Difference circuit 42 is responsive to pulse groups 27 and 45 for producing a group of $n$ time spaced composite signals, indicated as waveform 46 in Fig. 5, the amplitude of each composite signal being equal to the instantaneous difference between the amplitudes of corresponding pulses in pulse groups 27 and 45 multiplied by an amplification factor equal to the gain of the difference circuit. Composite signal group 46 is applied serially to delay line network 44 which simultaneously produces $n$ composite signals at the delay line network output terminals, as partly illustrated by composite signals $n$, 3, 2, 1 of waveforms 46, 47, 48, 50, respectively, in Fig. 5. Stated differently, the ($n$–1) delay line sections of delay line network 44 delay the $n$ time spaced composite signals of composite signal group 46 in accordance with the time intervals between the composite signals to simultaneously produce composite signals $n$, 3, 2, 1 of waveforms 46, 47, 48, 50, respectively, at the $n$ delay line taps.

More particularly, during the time interval in which composite signals 1, 2, 3, . . . $n$ of composite signal group 46, as shown in Fig. 5, are produced at tap 1 of delay line network 44, shown in Fig. 4, composite signals 1, 2, 3 of composite signal group 47, composite signals 1, 2 of composite signal group 48, and composite signal 1 of composite signal group 50 are produced at taps ($n$–2), ($n$–1), and ($n$), respectively. It can be seen, therefore, from waveforms 46, 47, 48, and 50 in Fig. 5, that, at one instant of time, composite signals $n$, 3, 2, 1 of composite signal groups 46, 47, 48, 50, respectively, are simultaneously produced at taps (1), ($n$–2), ($n$–1), and ($n$), respectively. It should be noted that, for purposes of illustration, only a few of the $n$ taps of delay line network 44 are shown in Fig. 4 and that only pertinent portions of the associated illustrative composite signal groups are shown in Fig. 5. It will be recognized, therefore, that composite signals $n$, 3, 2, 1 of composite signal groups 46, 47, 48, 50, respectively, represent only a fraction of the $n$ composite signals simultaneously produced at the $n$ delay line taps.

Averaging circuit 43 linearly adds composite signal groups 46, 47, 48, and 50 to produce a single group of composite signals, as shown by waveform 51 in Fig. 5, each composite signal in the group being equal in amplitude to the instantaneous sum of the amplitudes of the corresponding composite signals of groups 46, 47, 48, and 50 multiplied by a reduction factor. Accordingly, composite signal group 51 comprises a plurality of time spaced composite signals of varying amplitude, the amplitude of the $n$th composite signal having the greatest value because it represents the instantaneous sum of the greatest number of composite signals of composite signal groups 46, 47, 48, and 50. The value of the reduction factor is determined by the value of the resistors in averaging circuit 43 and the product of the reduction factor and the amplification factor of difference circuit 42 is equal to the first proportionality factor of combining network 13.

Composite signal group 51 is identical with composite signal group 38 shown in Fig. 3 and is applied to threshold circuit 14 which, as previously mentioned, is biased to a voltage level, waveform 52 in Fig. 5, such that an output pulse, as shown by waveform 53 in Fig. 5, is produced at output terminal 15 only when pulse group 27 applied to delay line network 12 comprises at least a predetermined minimum number of pulses. In other words, when the $n$ pulses of pulse group 27 is at least a predetermined minimum number of pulses, the amplitude of composite signal $n$ of composite signal group 51 exceeds the biasing voltage of threshold circuit 14, as shown by the relationship of waveforms 51 and 52 in Fig. 5, and output pulse 53 is produced at output terminal 15.

It will at once be obvious to those skilled in the art that any number of groups of pulses may be applied to the recognition circuit depending upon the number of communication channels employed in transmitting the identifying signal. To accommodate any particular number of groups of pulses, it is necessary only to expand or contract the operational scope of input network 11 in accordance with the number of pulse groups contemplated. This may be accomplished by increasing or reducing, respectively, the number of limiter networks and the number of delay line sections and T-pad attenuators in the alignment circuit. Consequently, when only one group of pulses is applied to the recognition circuit, input network 11 is reduced to a single limiter network to which the group of pulses is applied.

A special situation exists if the $n$ pulses of each of the $m$ groups of pulses applied to the recognition circuit are equally time spaced. In this special case, the $n$ pulses of pulse group 27, Figs. 3 and 5, applied to delay line network 12, Figs. 1 and 4, are also equally time spaced so that the (2Y)th delay line section of delay line network 12 of Fig. 1, where Y varies integrally from 1 through ($n-1$), and the ($n$–1) delay line sections of delay line network 44 of Fig. 4 have equal time delays, the time delays being equal to the time spacing between the $n$ pulses. As a result, many groups of pulses and composite signals will be simultaneously produced by delay line networks 12 and 44, respectively, and, in consequence thereof, the amplitudes of the composite signals of composite signal groups 38 and 51, Figs. 3 and 5, respectively, applied to threshold circuit 14, will have a less steep gradient than in the more general cases previously described. Accordingly, the biasing voltage of the threshold circuit will have to be more finely adjusted to ensure that an output pulse is produced at output terminal 15 only when at least the predetermined minimum number of pulses is applied to delay line network 12.

What is claimed as new is:

1. A recognition circuit for producing an output pulse in response to the application of a predetermined number of parallel trains of pulses, each of said trains having a maximum number of time-spaced pulses of equal amplitude and duration occurring in a selected time sequence, the pulses in each of said trains having a selected time and duration relation to the pulses of the other trains to define pulse groups, said circuit comprising: a plurality of limiter networks, each responsive to a different one of said parallel trains of pulses and limiting the noise signal carried therewith; a plurality of delay means connected in tandem, a resistive network coupling the individual ones of said limiter networks to selected points in the tandem connected delay means, the delays provided being selected to bring the pulses of said groups of pulses into time coincidence, such that the output provided from the tandem connected delay means is a single series of pulses, the values in said resistive network being selected such that the pulses are of equal weight; a plurality of series-connected delay line sections having predetermined delay periods, a first of said series connected delay line sections being coupled to the output of said delay lines connected in tandem, the delays in said series-connected delay line sections being selected to provide signals at taps between the delay lines which are in correspondence with the undelayed time sequence of the applied pulses and also in correspondence with signals delayed one pulse duration therefrom; averaging circuit means coupled to one group of taps within said series-connected delay line sections to combine pulses in synchronism with the undelayed time sequence of the applied pulses and also connected in like fashion to combine signals of the delayed sequence; a differencing circuit coupled to said averaging circuit means and responsive to both of the combined signals therefrom for providing a composite signal having an instantaneous amplitude dependent upon the difference in the amplitudes of the combined signals; and threshold means coupled to said differencing circuit for providing an output indication when the output of said differencing circuit exceeds a predetermined amount.

2. A recognition circuit for producing an output pulse in response to at least a predetermined minimum number of pulses of a sequence consisting of an integral number *n* of serially applied pulses of equal amplitude and duration, said circuit comprising: a first delay line section responsive to the serially applied pulse sequence for providing at its output signals of the same polarity delayed one pulse duration; a differencing circuit responsive to the serially applied pulse sequence and the delayed signals from the first delay line section for providing a composite signal proportional to the instantaneous difference between the serially applied pulse sequence and the delayed signals, such that a signal longer than one pulse duration is at least partially canceled against itself; a second plurality of delay line sections coupled in tandem and the first of said plurality of delay line sections being coupled to the output of said differencing circuit, the delays of the individual ones of said plurality of delay line sections being selected so as to make simultaneously available at preselected taps along said sections the successive pulses in said serially applied pulse sequence; an averaging network coupled to the preselected taps of said plurality of delay line sections for combining the signals instantaneously present at said taps; and a threshold circuit responsive to the combined signal from said averaging network for providing an output signal when said combined signal exceeds a predetermined amplitude.

3. A recognition circuit for developing an output pulse in response to at least a predetermined minimum number of pulses of an applied first group of time spaced pulses of equal amplitude and duration, said circuit comprising: delay means responsive to said first group of pulses to provide a delayed group of pulses, each pulse in said delayed group lagging the corresponding pulse in said first group by an interval of time equal to a pulse duration; a combining network coupled to said delay means and responsive to said first group of pulses and to said delayed group of pulses for combining said first group of pulses with said delayed group of pulses to develop a composite signal having an amplitude proportional to the instantaneous difference between the sum of the amplitudes of the individual ones of said first group of pulses and the sum of the amplitudes of the individual ones of said delayed group of pulses; and threshold means coupled to said combining network and responsive to said composite signal for developing an output pulse, said threshold means being biased to a predetermined voltage level.

4. The recognition circuit defined in claim 3 wherein said combining network includes an averaging network for combining into first and second output signals said first group of pulses and said delayed group of pulses, respectively, the amplitude of said first and second output signals corresponding, respectively, to the sum of the amplitudes of the individual ones of said first group of pulses multiplied by a reduction factor and the sum of the amplitudes of the individual ones of said delayed group of pulses multiplied by said reduction factor; and a difference network coupled to said averaging network and responsive to said first and second output signals for developing a composite signal equal in amplitude to the instantaneous difference between the amplitudes of said first and second output signals multiplied by an amplification factor.

5. A recognition circuit for developing an output pulse in response to at least a predetermined minimum number of applied pulses of equal amplitude and duration, said circuit comprising: pulse-delaying means providing a series of first time delays each being equal to the duration of one of said applied pulses, the number of said first time delays being equal to said predetermined number, said pulse-delaying means providing a series of second time delays each being equal to the period of said applied pulses, said second time delays occurring intermediate each of said first time delays, said pulse-delaying means being responsive to each of said applied pulses for developing a series of delayed pulses, the number of said delayed pulses being one less than twice said predetermined number, said delayed pulses and the last pulse of said predetermined number of applied pulses defining a series of pairs of first and second pulses, the number of pairs of pulses being equal to said predetermined number, the first pulses of said pairs lagging the second pulses of said pairs by an interval of time equal to a pulse duration; a difference circuit coupled to said pulse-delaying means for developing a composite signal having a first portion of one polarity and a second portion of the opposite polarity lagging said first portion by an interval of time equal to said pulse duration, the amplitude of said first and second portions being equal to the sum of the amplitudes of said first pulses and said second pulses, respectively, multiplied by a first proportionality factor; and threshold means, responsive to said composite signal, for developing an output pulse, said threshold means being biased to a voltage level equal to the product of a second proportionality factor smaller than said first proportionality factor and the product of the amplitude and the predetermined minimum number of said applied pulses.

6. A recognition circuit for producing an output pulse in response to the application of an integral number *m*, of time-spaced groups of an integral number *n* of time-spaced pulses of equal amplitude and duration, the time interval between pulses of any one group being equal to the time interval between corresponding pulses in any other group and the time interval between corresponding pulses of any two groups being equal to the time interval between any other corresponding pulses of the two groups, said circuit comprising: means including first delay means responsive to the individual groups of pulses for bringing like individual pulses of said groups into time coincidence to provide a first coincident group of $n$ time-spaced pulses of equal amplitude and duration; circuit means including second delay means coupled to said first-named means and responsive to said first coincident group of pulses to provide a delayed group of pulses, each pulse in said delayed group of pulses lagging a corresponding pulse in said first group of pulses by an interval of time equal to a pulse duration; means coupled in a predetermined manner to said second delay means for combining said first group of pulses with said delayed group of pulses to produce from the signals passing through said second delay means a composite signal having a first portion of one polarity and a second portion of the opposite polarity lagging said first portion by an interval of time equal to said pulse duration, the amplitude of said first and second portions being equal to the sum of the amplitudes of said first and second groups of pulses, respectively, multiplied by a first proportionality factor; and threshold means biased to a voltage level equal to the product of a second proportionality factor smaller than said first proportionality factor and the product of the amplitude and a predetermined minimum number of pulses of said first group of $n$ pulses, said threshold means being responsive to the portion of said composite signal exceeding said voltage level for producing an output pulse.

References Cited in the file of this patent

UNITED STATES PATENTS

| | | |
|---|---|---|
| 2,403,561 | Smith | July 9, 1946 |
| 2,444,741 | Loughlin | July 6, 1948 |
| 2,522,609 | Gloess | Sept. 19, 1950 |
| 2,523,283 | Dickson | Sept. 26, 1950 |
| 2,643,368 | Baker et al. | June 23, 1953 |
| 2,669,706 | Gray | Feb. 16, 1954 |
| 2,706,810 | Jacobson | Apr. 19, 1955 |
| 2,787,780 | Morris | Apr. 2, 1957 |
| 2,800,584 | Blake | July 23, 1957 |

UNITED STATES PATENT OFFICE
CERTIFICATION OF CORRECTION

Patent No. 2,976,516 March 21, 1961

John Everett Taber

It is hereby certified that error appears in the above numbered patent requiring correction and that the said Letters Patent should read as corrected below.

Column 5, line 20, before "output" insert -- and --; column 6, line 65, strike out "pulses", second occurrence; line 74, strike out "of"; column 7, line 75, for "based" read -- biased --; column 8, line 8, for "poduced" read -- produced --; line 17, for "2n-1" read -- (2n-1) --.

Signed and sealed this 29th day of August 1961.

(SEAL)
Attest:

ERNEST W. SWIDER
Attesting Officer

DAVID L. LADD
Commissioner of Patents